(12) United States Patent
Qasimi et al.

(10) Patent No.: US 8,640,552 B2
(45) Date of Patent: Feb. 4, 2014

(54) MEMS AIRFLOW SENSOR DIE INCORPORATING ADDITIONAL CIRCUITRY ON THE DIE

(75) Inventors: Mohammed Abdul Javvad Qasimi, Hilliard, OH (US); Lamar Floyd Ricks, Lewis Center, OH (US)

(73) Assignee: Honeywell International Inc., Morristown, NJ (US)

(*) Notice: Subject to any disclaimer, the term of this patent is extended or adjusted under 35 U.S.C. 154(b) by 210 days.

(21) Appl. No.: 13/226,264

(22) Filed: Sep. 6, 2011

(65) Prior Publication Data

US 2013/0055826 A1 Mar. 7, 2013

(51) Int. Cl.
*G01F 1/86* (2006.01)

(52) U.S. Cl.
USPC ........................................... 73/861.02

(58) Field of Classification Search
USPC ............... 73/861.02, 861.05, 204.23, 204.26
See application file for complete search history.

(56) References Cited

U.S. PATENT DOCUMENTS

| | | |
|---|---|---|
| 4,478,076 A | 10/1984 | Bohrer |
| 4,478,077 A | 10/1984 | Bohrer et al. |
| 4,501,144 A | 2/1985 | Higashi et al. |
| 4,548,078 A | 10/1985 | Bohrer et al. |
| 4,651,564 A | 3/1987 | Johnson et al. |
| 4,739,657 A | 4/1988 | Higashi et al. |
| 4,914,742 A | 4/1990 | Higashi et al. |
| 5,027,499 A | 7/1991 | Prohaska |
| 5,050,429 A | 9/1991 | Nishimoto et al. |
| 5,165,292 A | 11/1992 | Prohaska |
| 5,244,179 A | 9/1993 | Wilson |
| 5,263,380 A * | 11/1993 | Sultan et al. ............... 73/204.26 |
| 5,515,714 A * | 5/1996 | Sultan et al. ................ 73/25.01 |
| 5,965,813 A | 10/1999 | Wan et al. |
| 5,996,419 A | 12/1999 | Soku |
| 6,124,632 A | 9/2000 | Lo et al. |
| 6,131,453 A * | 10/2000 | Sultan et al. ............... 73/204.26 |
| 6,263,740 B1 | 7/2001 | Sridhar et al. |
| 6,647,778 B2 | 11/2003 | Sparks |
| 6,768,181 B2 | 7/2004 | Dwyer |
| 6,813,944 B2 | 11/2004 | Mayer et al. |
| 6,871,538 B2 | 3/2005 | Fujiwara et al. |
| 6,959,583 B2 | 11/2005 | Platt |

(Continued)

FOREIGN PATENT DOCUMENTS

| | | |
|---|---|---|
| DE | 102006053646 | 5/2008 |
| DE | 102010015522 | 2/2011 |

(Continued)

OTHER PUBLICATIONS

Search Report for Corresponding U.S. Appl. No. 12/182,466, Dated Nov. 22, 2012.

(Continued)

*Primary Examiner* — Jewel V Thompson
(74) *Attorney, Agent, or Firm* — Seager Tufte & Wickhem LLC.

(57) ABSTRACT

A MEMS airflow sensor die having a heater control circuit, differential instrumentation amplifier, temperature compensation, and/or offset correction circuitry integrated with an airflow sensor on the MEMS die. The added circuitry may be placed on space available on the basic airflow die with MEMS fabrication techniques without enlarging the sensor die. The die with the added circuitry may result in a device having a reduced form factor, improved reliability and lower cost.

20 Claims, 9 Drawing Sheets

(56) References Cited

U.S. PATENT DOCUMENTS

| | | | |
|---|---|---|---|
| 7,003,418 | B2 | 2/2006 | Bonne et al. |
| 7,059,186 | B2 | 6/2006 | Pinter et al. |
| 7,131,766 | B2 * | 11/2006 | Sultan et al. .................. 374/29 |
| 7,154,372 | B2 | 12/2006 | Vanha et al. |
| 7,219,551 | B2 | 5/2007 | Suzuki |
| 7,237,437 | B1 | 7/2007 | Fedora |
| 7,258,003 | B2 | 8/2007 | Padmanabhan et al. |
| 7,278,309 | B2 | 10/2007 | Dmytriw et al. |
| 7,436,037 | B2 | 10/2008 | Kurtz et al. |
| 7,490,511 | B2 | 2/2009 | Mayer et al. |
| 7,493,823 | B2 | 2/2009 | Stewart et al. |
| 7,513,149 | B1 | 4/2009 | Ricks |
| 7,603,898 | B2 | 10/2009 | Speldrich |
| 7,610,803 | B2 | 11/2009 | Ricks |
| 7,691,652 | B2 | 4/2010 | Van Der Wiel |
| 7,763,487 | B2 | 7/2010 | Villa et al. |
| 7,765,978 | B2 | 8/2010 | Ruesch et al. |
| 7,798,010 | B2 | 9/2010 | Morales et al. |
| 7,833,829 | B2 | 11/2010 | Eskridge et al. |
| 8,082,798 | B2 | 12/2011 | Morales et al. |
| 2005/0022593 | A1 | 2/2005 | Franz et al. |
| 2006/0142634 | A1 | 6/2006 | Anstadt et al. |
| 2011/0030468 | A1 | 2/2011 | Chen et al. |
| 2011/0154885 | A1 * | 6/2011 | Nakano et al. ............... 73/25.03 |
| 2011/0252882 | A1 | 10/2011 | Beck et al. |

FOREIGN PATENT DOCUMENTS

| | | |
|---|---|---|
| EP | 0669521 | 8/1995 |
| EP | 1182432 | 2/2002 |
| EP | 1376073 | 1/2004 |
| EP | 2040046 | 3/2009 |
| JP | 2007071687 | 3/2007 |
| WO | 2006026633 | 3/2006 |

OTHER PUBLICATIONS

Eusik Yoon et al. "An Integrated Mass Flow Sensor with On-Chip Interface Circuitry," IEEE Transactions on Electron Devices, IEEE Service Center, vol. 39, No. 6, pp. 1376-1386, Jun. 1, 1992. ISSN: 0018-9383, DOI: 10.1109/16.137317.

Stemme, "A CMOS Integrated Silicon Gas-Flow Sensor with Pulse-Modulated Output," Sensors and Actuators, Elsevier Sequoia S.A. vol. 14, No. 3, pp. 293-303, Jul. 1, 1988. XP00000219, DOI: 10.1016/0250-6874(88)80075-1.

International Search Report for Corresponding European Application No. 11162695.8, Dated Feb. 10, 2012.

* cited by examiner

MEMS AIRFLOW SENSOR DIE INCORPORATING ADDITIONAL CIRCUITRY ON THE DIE

BACKGROUND

The present disclosure pertains to sensors and particularly to flow sensors. More particularly the disclosure pertains to flow sensors on MEMS die.

SUMMARY

The disclosure reveals a MEMS airflow die having a heater control circuit, differential instrumentation amplifier, temperature compensation, and/or offset correction circuitry integrated with the airflow sensor on the MEMS die. The added circuitry may be placed on space available on the airflow die without enlarging the die. The present die may result in a flow sensor package having a reduced form factor, improved reliability and lower cost.

DESCRIPTION

Micro electromechanical systems (MEMS) devices may be made up of components between 1 to 100 micrometers in size and MEMS devices may generally range in size from 20 micrometers to a millimeter. However, MEMS devices could be more than 1 millimeter.

One may integrate the complete signal processing in the MEMS structure. Some of the competitive MEMS structures integrate all the signal processing components in a transducer element. These signal processing components include temperature correction, shape correction, memory for traceability, digital to analog converters (DACs) and analog to digital converters (ADCs), Digital signal processor (DSP), internal clock, multiplexer, and so forth. While this may be one way to approach an issue, it is overkill and an inefficient and a very expensive way towards a simple solution for customers who simply need a basic and cheap sensor with average accuracies for use in industrial, HVAC and other applications.

There is a need for a basic micro electromechanical systems airflow die with an integrated differential instrumentation amplifier and offset correction circuitry. The basic micro bridge-based airflow die may have a drawback in the sense that it only has a transducer element. Various flow sensors may be dependent on an external differential instrumentation amplifier and offset correction circuitry. The differential instrumentation amplifier circuit may consist of at least one quad operational amplifier and a number of external resistors.

Issues with external circuitry may incorporate the following: 1) External components may add up to increase the raw material costs, assembly cost and increase the overall product cost; 2) Added components may reduce the overall reliability of a final product by many fold; 3) The final accuracy of a finished product may be a factor of the accuracies of the external components, and thus the accuracy and error bands of the finished product could be higher than the transducer itself; 4) The external components may take up significant real estate on the circuit board and result in a physically bigger product; 5) A quad operational amplifier may have its own noise, including thermal and shot noise, in that such noise could add a noise factor to the signal to noise ratio of the overall system and decrease the accuracy of the sensor; and 6) The differential instrumentation amplifier may have a leakage current which could be an issue while measuring very small voltages as in a setup having a sensitive flow sensor for detecting fluid (i.e., gas or liquid) flows of low magnitude.

There is a need for an airflow die with integrated differential instrumentation amplification and offset correction situated on the die. With integrated differential amplification circuitry within the MEMS airflow microstructure, the above noted issues may be addressed and/or mitigated. This approach may result in a small, simple and inexpensive solution to providing a basic airflow sensor.

An airflow die with an integrated instrumentation amplifier and offset circuit may have the following advantages: 1) Reducing the cost the product by eliminating an external quad op-amp, and other assembly and laser trimming operations on the circuit; 2) Reducing size of the final assembled sensor; 3) Reducing noise caused by an external amplifier and passive components; and 4) Reducing the leakage current; and 5) Increasing the reliability of the sensor.

An integrated MEMS airflow structure may consist of at least two cores. First, there may be a core transducing element itself that is used as a flow sensing element. Second, there may be instrumentation amplification and offset correction circuitry to carry the transduced signal to the output.

The core transducer flow sensing element may be: 1) A micro bridge structure with a full Wheatstone bridge (as today's structure); or 2) a membrane/diaphragm structure with a full Wheatstone bridge. The bridge may alternatively be partial.

The instrumentation amplification and offset correction circuitry may be fabricated using bulk micromachining techniques such as deep reactive ion etching (DRIE) and/or surface micromachining techniques during the fabrication of a microstructure.

The following considerations may be noted: 1) A MEMS structure may contain just a transducer element (un-amplified) that might provide a very low signal output and thus not be very sensitive in measuring a flow; 2) An application specific integrated circuit (ASIC) may be used in a flow sensor to perform the amplification and offset correction, which could add to the cost of the product, decrease the reliability of the product, decrease the signal to noise ratio, and result in a final product with increased size because of one or more component sizes; and 3) A complete signal processing may be integrated in the MEMS structure, such as in the transducer element.

The signal processing components may incorporate temperature correction, shape correction, memory for traceability, digital to analog converters (DAC) and analog to digital converters (ADC), a digital signal processor (DSP), an internal clock, a multiplexer, and so on. While this may be one approach to the solution, it appears to be an over-kill, a more inefficient and much greater expensive way towards a simple solution for customers who simply need a basic and inexpensive sensor with average accuracies for use in industrial, HVAC and other applications.

The present sensor may incorporate the following items. It may be a MEMS flow die fabricated with, for example, an integrated differential instrumentation amplifier and offset correction circuitry. The offset correction circuitry may be interconnected with the amplifier. The MEMS die may then be packaged in a flow tube and an amplified differential output from that MEMS die may be brought straight to the pins without any additional amplification or offset correction. The size of the finished product may be reduced significantly by eliminating front-end circuitry. The cost of this basic sensor may be many times (i.e., at least two times) less expensive than a related art product for comparable purposes. The accuracy of the present sensor may be match that of those in the competitive related art market and yet also be in greater demand in the industrial and HVAC applications. The size of the MEMS die may be virtually the same size as a single airflow MEMS die without the additional circuitry. The additional circuitry may be incorporated into a robust flow die which appears to have about fifty percent of unused silicon space. That may mean the form factor of the flow sensor package having additional circuitry together with the flow sensor is improved by at least two times, for instance, reduced to one-half. This unused silicon space or structure may be leveraged by integrating the differential instrumentation, such as amplification for instance, and voltage correction, such as offset compensation for example, within the unused MEMS space or structure of a basic fluid flow die, with MEMS fabrication techniques. Temperature compensation and control circuitry and components may also be integrated into the flow sensor die with MEMS fabrication.

Figure 1:
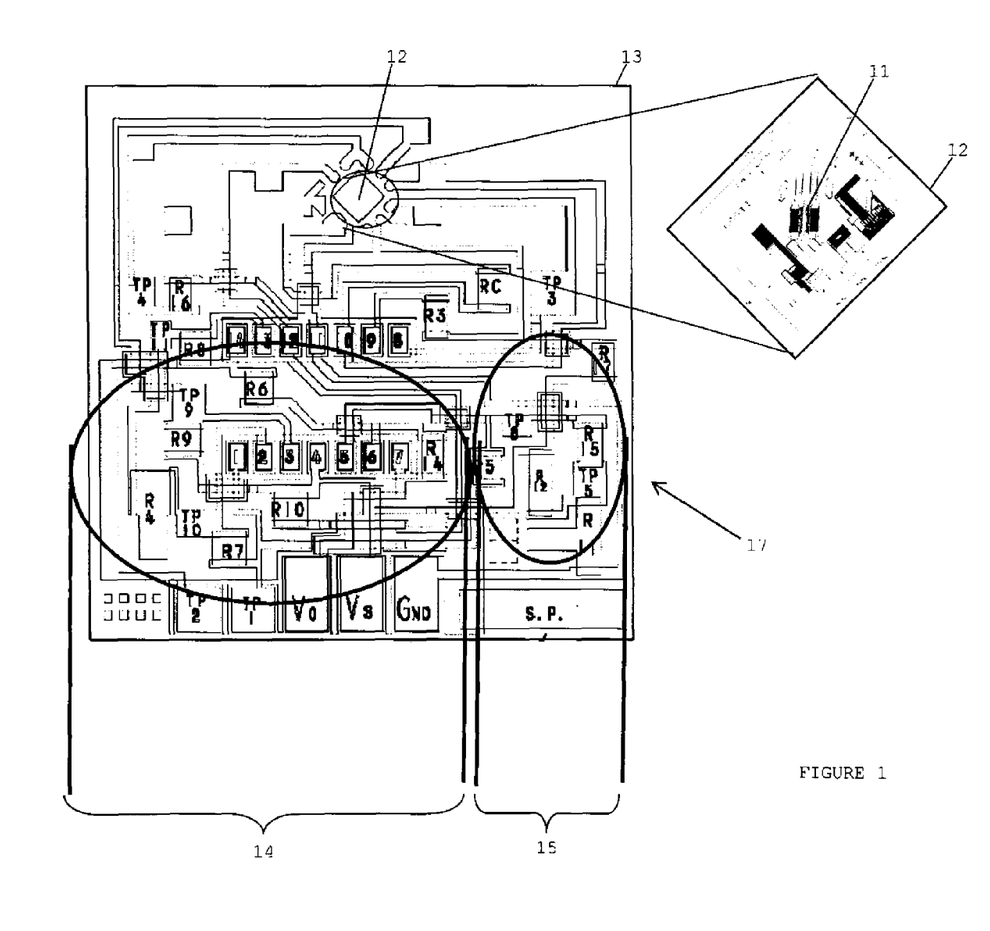
FIG. 1 is a diagram of a fluid flow sensor on a MEMS die situated on a circuit board.

FIG. 1 is a diagram of a fluid flow sensor 11 in a MEMS die 12 situated on a printed circuit board (PCB) 13. To support the flow sensor 11, and amplify and compensate signals from flow sensor 11, there may be differential instrumentation amplifier circuitry 14 and heater control circuitry 15 situated on circuit board 13. Although not explicitly shown, there also may be a temperature compensation circuit on board 13. An arrangement 17 in FIG. 1 for flow sensor 11 appears to have a large form factor, many components, significant cost and low reliability.

Figure 2:
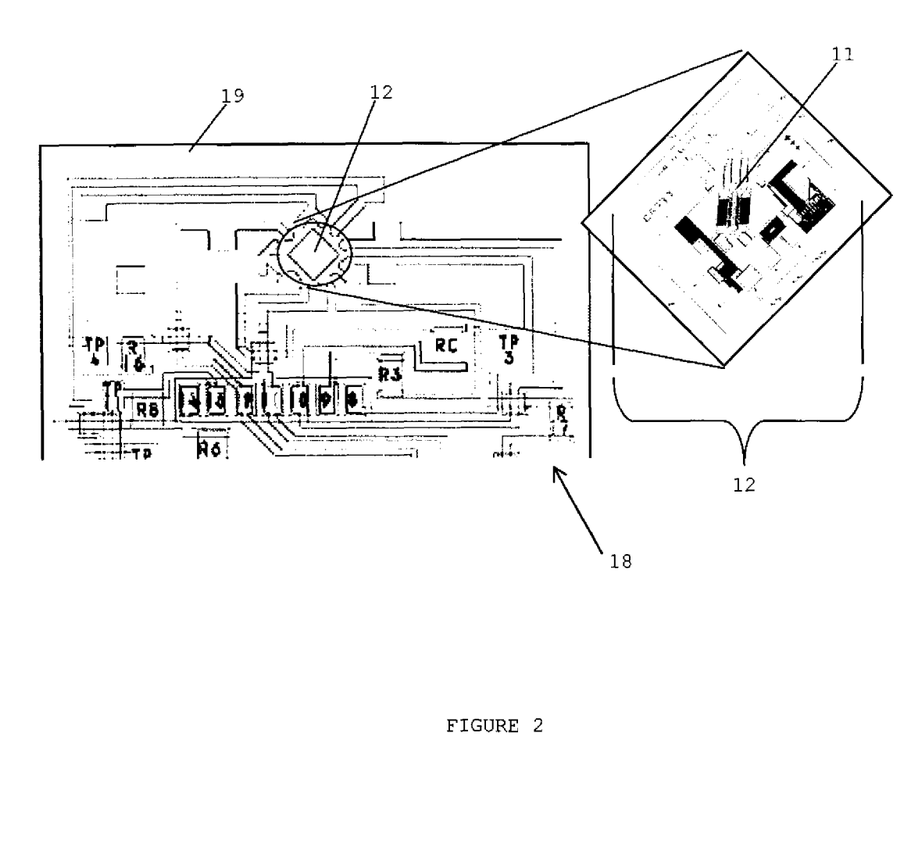
FIG. 2 is a diagram of a closer view of an arrangement having a fluid flow sensor on a MEMS die situated on a printed circuit board.

FIG. 2 is a diagram of an arrangement 18 with a fluid flow sensor 11 on a MEMS die 12 situated on a printed circuit board 19. To support the flow sensor 11, and amplify and compensate signals from flow sensor 11, there may be instrumentation amplifier circuitry 14 and heater control circuitry 15 situated on circuit board 19. Also, there may be temperature compensation circuit on board 19. Differential instrumentation amplifier circuitry 14 and heater control circuitry 15 may instead be situated on MEMS die 12. Similarly, a temperature compensation circuit may be situated in MEMS die 12. Items 14 and 15 may be added to die 12 with MEMS fabrication techniques. The size of die 12 need not necessarily be enlarged. There may be sufficiently enough extra space on die 12 for items 14 and 15. Also, there may be additional sufficient space for temperature compensation circuitry. Additional circuitry and items are not necessarily added since that would may require a larger die, be excessively expensive, be overkill for a basic airflow sensor, and be an inefficient way to achieve a basic and inexpensive sensor with average accuracies for use in industrial, HVAC and other applications. The resulting sensor die 12 may be a bridge based and/or membrane based moisture resistant fluid flow sensor MEMS structure 12 with a small form factor, low cost and high reliability.

Figure 3:
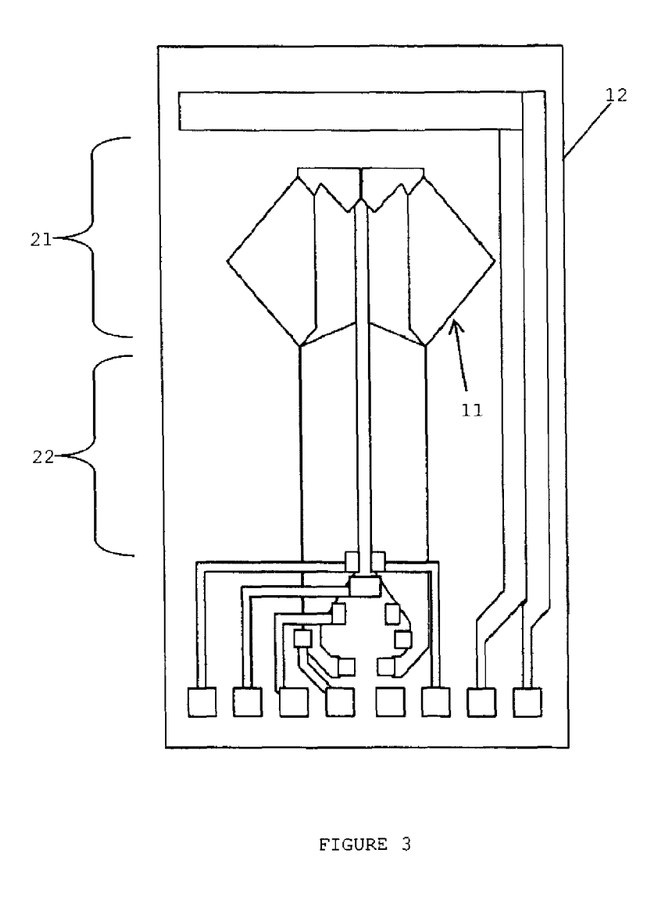
FIG. 3 is a diagram of a bridge based MEMS flow die revealing the space available for additional items.

FIG. 3 is a diagram of a bridge based MEMS flow die 12 revealing the space available for additional items. Die 12 in the present disclosure may be silicon but could be of another appropriate material. Also, sensor 11 in the present disclosure may be an airflow sensor but could be a fluid sensor of another kind such as that of liquid.

Space 21 indicates the area on die 12 that may be used for a Wheatstone bridge of flow sensor 11. Space 22 indicates the area on die 12 that may be available for other items such as differential instrumentation amplifier circuitry 14 and heater control circuitry 15 of board 13 in FIG. 1. There may be an area in space 22 available for a temperature compensation circuit. Die 12 does not necessarily need to be increased in size.

Figure 4:
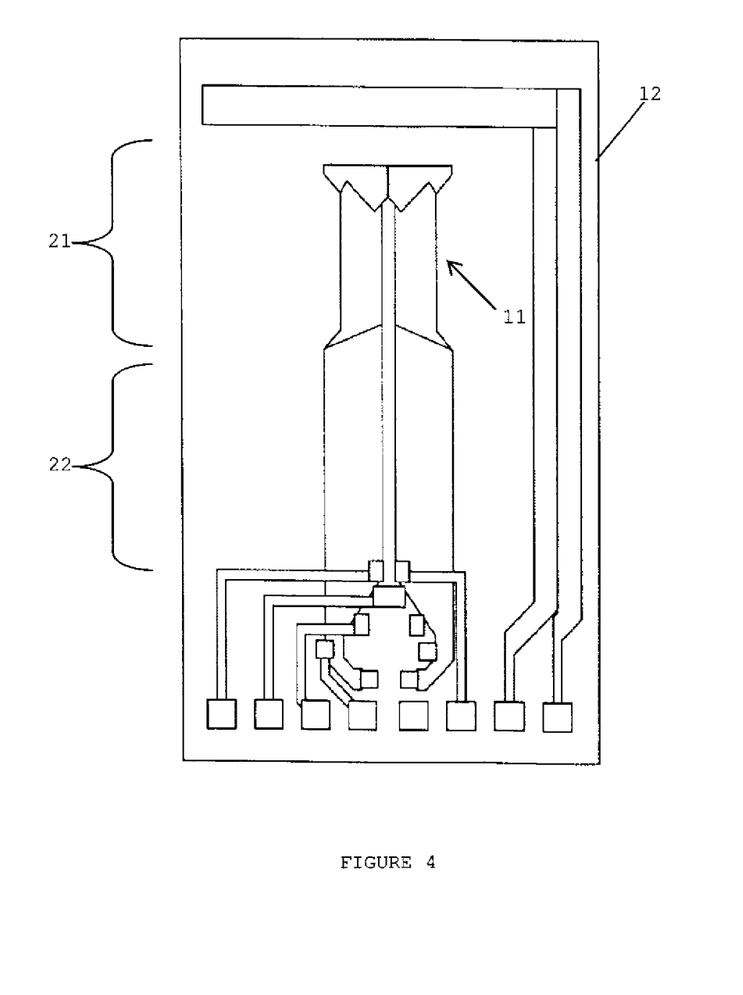
FIG. 4 is a diagram of a membrane based MEMS flow die similar to the die in FIG. 3, revealing a space which may be available for additional items.

FIG. 4 is a diagram of a membrane based MEMS flow die 12 similar to die 12 in FIG. 3, revealing a space 22 which may be available for additional items 14 and 15. Space 21 indicates the area for the Wheatstone bridge in FIG. 4. Remaining space 22 may amount to about 50 percent of the total space on die 12 in FIGS. 3 and 4.

Figure 5:
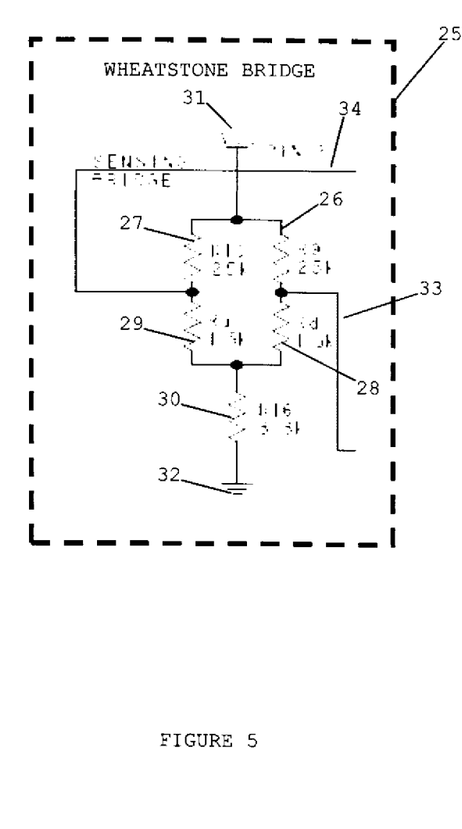
FIG. 5 is a diagram of an example Wheatstone bridge circuit which may be an electronic schematic of the flow sensor situated on a MEMS die structure.

FIG. 5 is a diagram of an example Wheatstone bridge circuit 25 which may be an electronic schematic of the flow sensor 11 situated on the MEMS die 12. Resistors 26-29 may operate on a heat transfer principle. A difference in voltages from the upstream and downstream resistors may be indicative of a fluid flow over the sensor. A differential output voltage may be changed by a mass air flow. The upstream and downstream resistors may be parallel to each other. These resistors may be formed in a serpentine fashion. Resistors 26 and 27 may have first ends connected to a voltage (Vcc) 31. Resistors 28 and 29 may have first ends connected to a ground or reference voltage 32 via a resistor 30. A second end of resistor 26 may be connected to a second end of resistor 28. A second end of resistor 27 may be connected to a second end of resistor 29. The connection of the second ends of resistors 26 and 28 may be connected to a line 33. The connection of the second ends of resistors 27 and 29 may be connected to a line 34. Lines 33 and 34 represent connections to the sensing bridge of circuit 25. Resistors 26, 27, 28, 29 and 30 may have values of 25K, 25K, 1.5K, 1.5K and 3.3K ohms, respectively.

Figure 6:
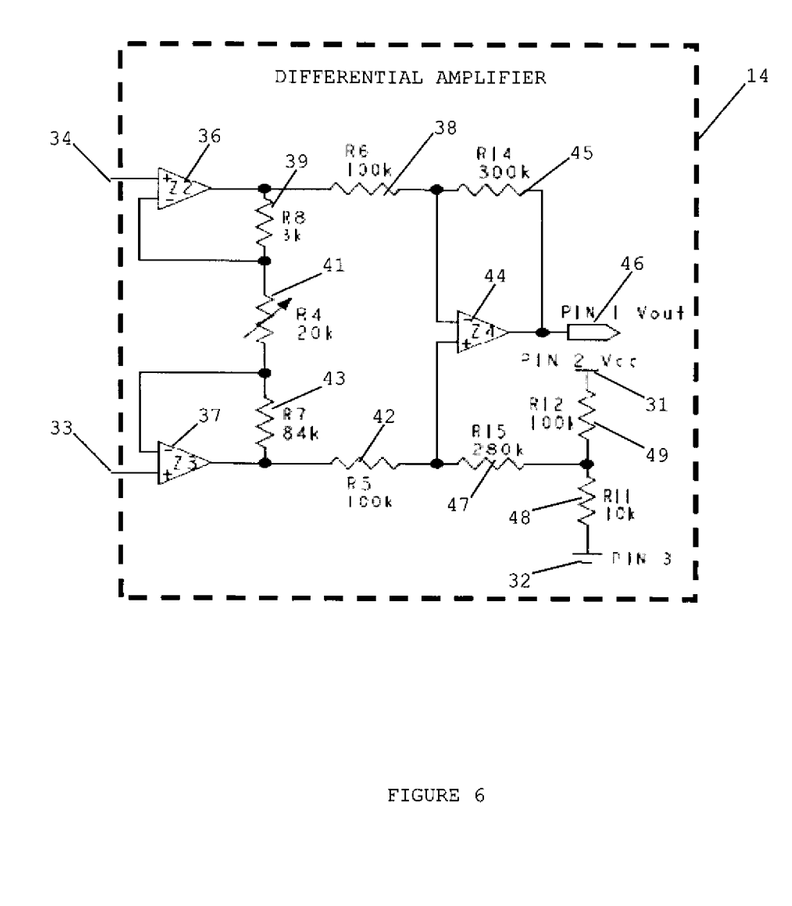
FIG. 6 is a diagram of an example of the differential amplifier circuit.

FIG. 6 is a diagram of an example of the differential amplifier circuit 14. Lines 33 and 34 of bridge circuit 25 may be connected to lines 33 and 34, respectively, of circuit 14. Line 34 may be connected to a non-inverting input of an operational amplifier (op-amp) 36. Line 33 may be connected to a non-inverting input of an op-amp 37. An output of op-amp 36 may be connected to a first end of a 100K ohm resistor 38 and to a first end of a 3K ohm resistor 39. A second end of resistor 39 may be connected to an inverting input of op-amp 36 and to a first end of a variable 20K ohm resistor 41. An output of op-amp 37 may be connected to a first end of a 100K ohm 42 and to a first end of an 84K ohm resistor 43. A second end of resistor 43 may be connected to an inverting input of op-amp 37 and to a second end of variable resistor 41. A second end of resistor 38 may be connected to an inverting input of op-amp 44 and to a first end of a 300K ohm resistor 45. A second end of resistor 45 may be connected to an output of op-amp 44 and to an out terminal 46 for circuit 14. A second end of resistor 42 may be connected to a non-inverting input of op-amp 44 and to a first end of a 280K ohm resistor 47. A second end of resistor 47 may be connected to a first end of a 10K ohm resistor 48 and to a first end of a 100K ohm resistor 49. A second end of resistor 48 may be connected to ground or reference voltage 32. A second end of resistor 49 may be connected to voltage (Vcc) 31.

Figure 7:
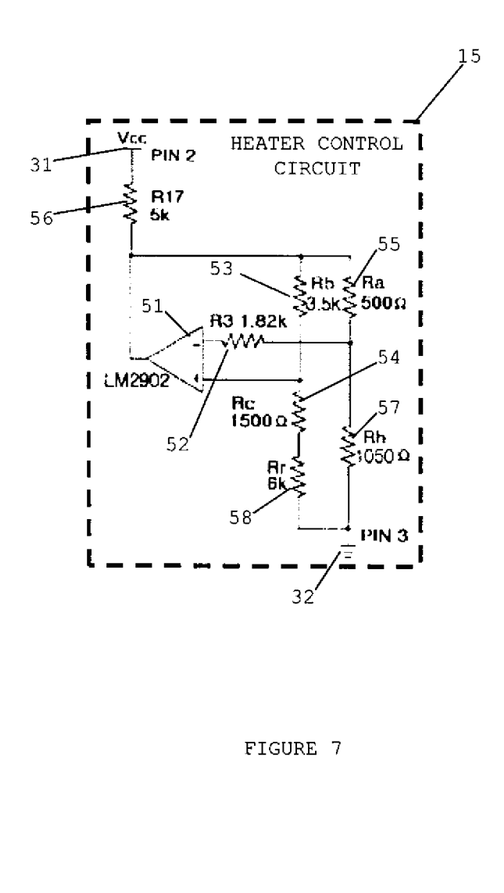
FIG. 7 is a diagram of an example of the heater control circuit.

FIG. 7 is a diagram of an example of the heater control circuit 15. The heater control circuit would ensure that a heater resistor is maintained at a constant temperature above ambient temperature. For example, the heater resistor may be a heating element for the flow sensor die. The heating element may be considered as part of the heater control circuit or separate from it.

For example of a heater control circuit application, if the ambient temperature is 25 degrees C., the heater temperature could be at 100 degrees C. during operation of the device. There are multiple ways to design a heater control circuit. One of the ways is described below. An inverting input of an op-amp 51 (LM2902) may be connected to a first end of a 1.82K ohm resistor 52. A non-inverting input of op-amp 51 may be connected to a first end of a 3.5K ohm resistor 53 and a first end of a 1500 ohm resistor 54. A second end of resistor 53 is connected to an output of op-amp 51, a first end of a 500 ohm resistor 55 and to a first end of a 5K ohm resistor 56. A second end of resistor 56 may be connected to voltage (Vcc) 31. A second end of resistor 52 may be connected to a second end of resistor 55 and to a first end of a 1050 ohm resistor 57. A second end of resistor 57 may be connected to a ground or reference voltage 32. A second end of resistor 54 may be connected to a first end of a 6K ohm resistor 58. A second end of resistor 58 may be connected to the ground or reference voltage 32.

Figure 8:
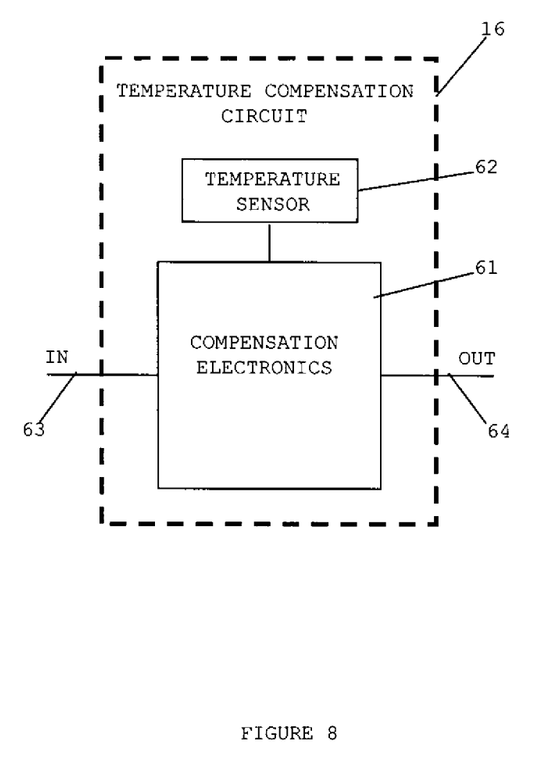
FIG. 8 is a block diagram of an example temperature compensation circuit.

FIG. 8 is a block diagram of an example temperature compensation circuit 16. Compensation electronics 61 may incorporate compensation circuitry appropriate for the circuits associated with die 12 in FIGS. 1-4. A temperature sensor 62 may be connected to compensation electronics 61. An input terminal 63 may be a signal to be temperature compensated and an output terminal 64 may provide the temperature compensated signal. The temperature sensor may be considered as part of a temperature compensation circuit or separate from it.

An output of the fluid flow sensor may indicate a magnitude of a flow of fluid through the flow sensor. Changes of the magnitude of the flow of fluid indicated at the output of the flow sensor due to temperature of the die may be compensated for with the temperature compensation circuit. The circuit may be connected to a temperature sensor on or in the die.

Figure 9:
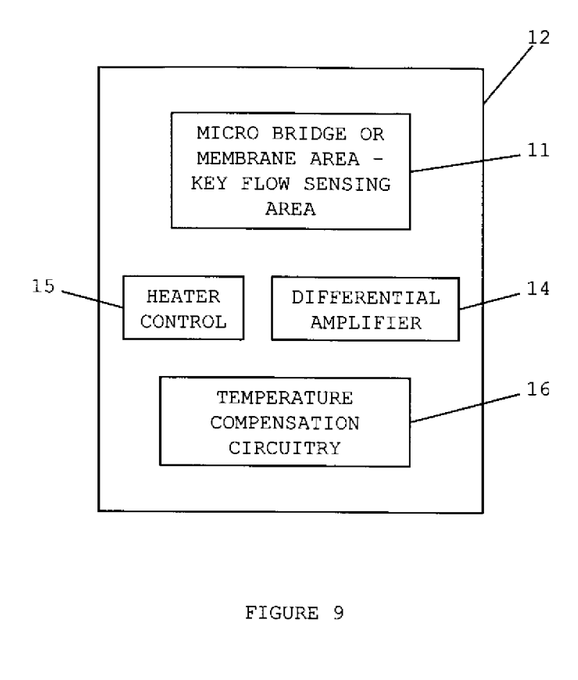
FIG. 9 is a diagram of a die similar to the die of FIGS. 1-4 but showing a specific placement of the additional circuitry of a heater control, a differential amplifier and temperature compensation.

FIG. 9 is a diagram of a die 12 which may be incorporated as the die in FIGS. 1-4. The diagram of die 12 in FIG. 9 may have items 14, 15 and/or 16 along with flow sensor 11. Even though items 14, 15 and 16 appear on die 12, there may be one, two or three items in a combination as determined acceptable for a flow sensor design at hand. Flow sensor 11 may have one or more temperature sensors and a heater. Also, a temperature reference sensor may be used in conjunction with flow sensor 11 on die 12. Conducting lines from the various components may be interconnected or brought out to connection pads for internal and external connections.

In the present specification, some of the matter may be of a hypothetical or prophetic nature although stated in another manner or tense.

Although the present system and/or approach has been described with respect to at least one illustrative example, many variations and modifications will become apparent to those skilled in the art upon reading the specification. It is therefore the intention that the appended claims be interpreted as broadly as possible in view of the prior art to include all such variations and modifications.

What is claimed is:

1. A fluid flow sensor arrangement comprising:
a micro electromechanical systems fabricated fluid flow sensor die having a fluid flow sensor;
a temperature sensor formed in available space on the die; and
a temperature compensation circuit formed in available space on the die and connected to the temperature sensor and to an output of the fluid flow sensor; and
wherein:
the output of the fluid flow sensor indicates a magnitude of a flow of fluid through the flow sensor; and
changes of the magnitude of the flow of fluid indicated at output of the flow sensor due to a temperature of the die are compensated with the temperature compensation circuit.

2. The arrangement of claim 1, further comprising:
an amplifier formed in available space on the die to amplify the output of the flow sensor; and
wherein the amplifier comprises a differential circuit to reduce offsets at the output.

3. The arrangement of claim 1, further comprising:
a heating element on the die; and
a heater control circuit formed on the die and connected to the temperature sensor and the heating element to maintain a pre-selected operating temperature for the fluid flow sensor.

4. The arrangement of claim 3, wherein:
the fluid flow sensor is an airflow sensor; and
the temperature sensor, temperature compensation circuit, the amplifier, the heating element and the heater control circuit are formed on the die with micro electromechanical systems fabrication techniques.

5. The arrangement of claim 4, wherein:
the flow sensor comprises a bridge based moisture resistant micro electromechanical systems structure; and
the structure comprises at least a partial Wheatstone configuration.

6. The arrangement of claim 4, wherein the flow sensor comprises a membrane based moisture resistant micro electromechanical systems structure.

7. A fluid flow sensor die comprising:
a given micro electromechanical systems fabricated fluid flow sensor die having a flow sensor; and
an amplifier added to the flow sensor die; and
wherein:
the amplifier is formed on the flow sensor die with micro electromechanical systems fabrication techniques; and
the amplifier is connected to an output of the flow sensor.

8. The die of claim 7, further comprising:
flow sensor output offset correction circuitry added to and formed on the flow sensor die with micro electromechanical systems fabrication techniques; and
wherein the flow sensor output offset correction circuitry is interconnected with the amplifier.

9. The die of claim 7, wherein:
the flow sensor comprises a Wheatstone bridge; and
the amplifier comprises a differential circuit.

10. The die of claim 9, further comprising a heater control circuit added with micro electromechanical systems fabrication techniques to the flow sensor die.

11. The die of claim 10, further comprising a temperature compensation circuit added with micro electromechanical systems fabrication techniques to the flow sensor die.

12. The die of claim 7, wherein:
the die comprises silicon; and
the flow sensor is selected from a group consisting of a bridge based moisture resistant airflow sensor and a membrane based moisture resistant airflow sensor.

13. A fluid flow sensor system comprising:
a micro electromechanical systems fabricated flow sensor die having a fluid flow sensor; and
a heater control circuit formed on the flow sensor die with micro electromechanical systems fabrication techniques.

14. The system of claim 13, further comprising:
a differential amplifier formed in the micro electromechanical systems fabricated flow sensor die; and
wherein the differential amplifier is connected to an output of the flow sensor.

15. The system of claim 14, further comprising:
a temperature compensation circuit formed in the micro electromechanical systems fabricated flow sensor die; and
wherein the temperature compensation circuit compensates for variations of magnitude indications of flow from the output of the flow sensor due to temperature changes in the flow sensor die.

16. The system of claim 15, wherein the flow sensor is a bridge-based micro electromechanical systems flow die.

17. The system of claim 15, wherein the flow sensor is a membrane-based micro electromechanical systems flow die.

18. The system of claim 15, wherein the flow sensor comprises a Wheatstone bridge.

19. The system of claim 13, further comprising:
an amplifier connected to an output of the fluid flow sensor;
a die temperature sensor;
a temperature compensation circuit connected to the die temperature sensor and to an output of the amplifier; and
a die heating element; and
wherein:
the heater control circuit is connected to the die temperature sensor and the die heating element; and
the amplifier, the die temperature sensor, the temperature compensation circuit, the die heating element, and the heater control circuit are formed in available space on the flow sensor die with micro electromechanical systems fabrication techniques.

20. The system of claim 19, wherein the fluid flow sensor is an airflow sensor.

* * * * *